US006530280B2

(12) United States Patent
Schmermund

(10) Patent No.: US 6,530,280 B2
(45) Date of Patent: Mar. 11, 2003

(54) HYPSOMETER

(76) Inventor: George Schmermund, 1660 Marbella Dr., Vista, CA (US) 92083

( * ) Notice: Subject to any disclaimer, the term of this patent is extended or adjusted under 35 U.S.C. 154(b) by 0 days.

(21) Appl. No.: 09/816,986

(22) Filed: Mar. 26, 2001

(65) Prior Publication Data

US 2002/0134162 A1 Sep. 26, 2002

(51) Int. Cl.$^7$ .............................. G01L 19/04
(52) U.S. Cl. ............................ 73/708; 73/384
(58) Field of Search ........................ 73/708, 784, 701, 73/384; 702/157

(56) References Cited

U.S. PATENT DOCUMENTS

| | | | | |
|---|---|---|---|---|
| 3,276,262 A | * | 10/1966 | Sapoff et al. | 73/384 |
| 3,701,283 A | * | 10/1972 | Lichfield | 73/384 |
| 4,388,829 A | | 6/1983 | Dauphinee | 73/384 |
| 5,048,337 A | * | 9/1991 | Ruppert | 73/384 |

OTHER PUBLICATIONS

Benedict, Robert P; Fundamentals of Temperature, Pressure and Flow Measurements; Wiley, p. 115.

* cited by examiner

*Primary Examiner*—William Oen
*Assistant Examiner*—Andre Allen

(57) ABSTRACT

A hypsometer for use to calibrate thermometers having 1) an elongated vessel for containment of a working fluid, 2) a heating element for heating the fluid to its boiling point, 3) a vapor jacket to provide an escape path for the vapor, 4) a vapor chamber near the lower end of the vapor jacket, and 5) a thermometer holder to hold a thermometer at a position with its sensor tip inside the vapor chamber. Equalization of pressure between the interior of the vessel and the outside atmosphere is assured by allowing the vapor to escape through the vapor jacket. Near the lower end of the vapor jacket is a narrow opening where working fluid, in liquid state, collects to form a liquid seal, thus forcing the vapor through the vapor chamber before it can escape.

8 Claims, 2 Drawing Sheets

HYPSOMETER

BACKGROUND OF THE INVENTION

Hypsometers were originally used for determining atmospheric pressure by measuring the boiling point of a liquid. The boiling points of most fluids are functions of pressure, and for some liquids (such as water), the relationship between boiling point and pressure has been extensively studied and the results published. Thus if one wants to know the atmospheric pressure, one can determine it by measuring the boiling point of a fluid (such as water) for which the relationship between boiling point and pressure is known. Conversely, if the atmospheric pressure is accurately known, then a hypsometer can be used to calibrate thermometers at the boiling point of a fluid such as water. The present invention is concerned with the use of hypsometers as a means for calibrating thermometers at a boiling point, more specifically, the boiling point of pure water.

Calibration of precision thermometers requires the use of accurately known temperature standards, probably the best known standard is the triple point of water. However the triple point provides a standard at only one temperature. Often, calibrations at other temperatures are needed. The boiling point of water is a convenient standard at around 100 degrees C. It is inherently not as reliable as the triple point because the boiling point depends on the atmospheric pressure, but assuming that the atmospheric pressure can be measured independently to a high enough degree of accuracy, then the boiling point of fluids (such as water) having accurately known relationship between boiling and pressure is useful for calibration of thermometers.

The present invention provides a hypsometer for calibration of thermometers at the boiling point of water to an accuracy of 0.01 degree C.

SUMMARY OF THE INVENTION

One preferred embodiment of the invention provides a hypsometer for use to calibrate thermometers comprising 1) an elongated vessel for containment of a working fluid, 2) means for heating said fluid to its boiling point, 3) a vapor jacket to provide a path for the vapor to escape to the atmosphere, 4) a vapor chamber near the lower end of the vapor jacket, and 5) a thermometer holder to hold a thermometer at a position with it sensor tip inside the vapor chamber. Equalization of pressure between the interior of the vessel and the outside atmosphere is assured by allowing the vapor to escape through the vapor jacket. Equalization of pressure is further assisted by having the vessel long enough to assure that as the fluid is heated to boiling at one end of the vessel, vapor condenses near the other end at a sufficient rate to prevent any appreciable increase of pressure inside the vessel. The vapor jacket also serves as a means for liquid to enter the vessel; the liquid can be condensed vapor or working fluid from an external source added to the vessel for replenishment of the supply of working fluid in the vessel; Near the lower end of the vapor jacket is a narrow opening where working fluid, in liquid state, collects to form a liquid seal allowing liquid to pass through (downward), but preventing passage of vapor (upward), thereby assuring that the vapor from the vessel must pass through the vapor chamber (around the sensor tip of the thermometer) before escaping into the atmosphere.

DETAILED DESCRIPTION OF THE INVENTION

Figure 1:
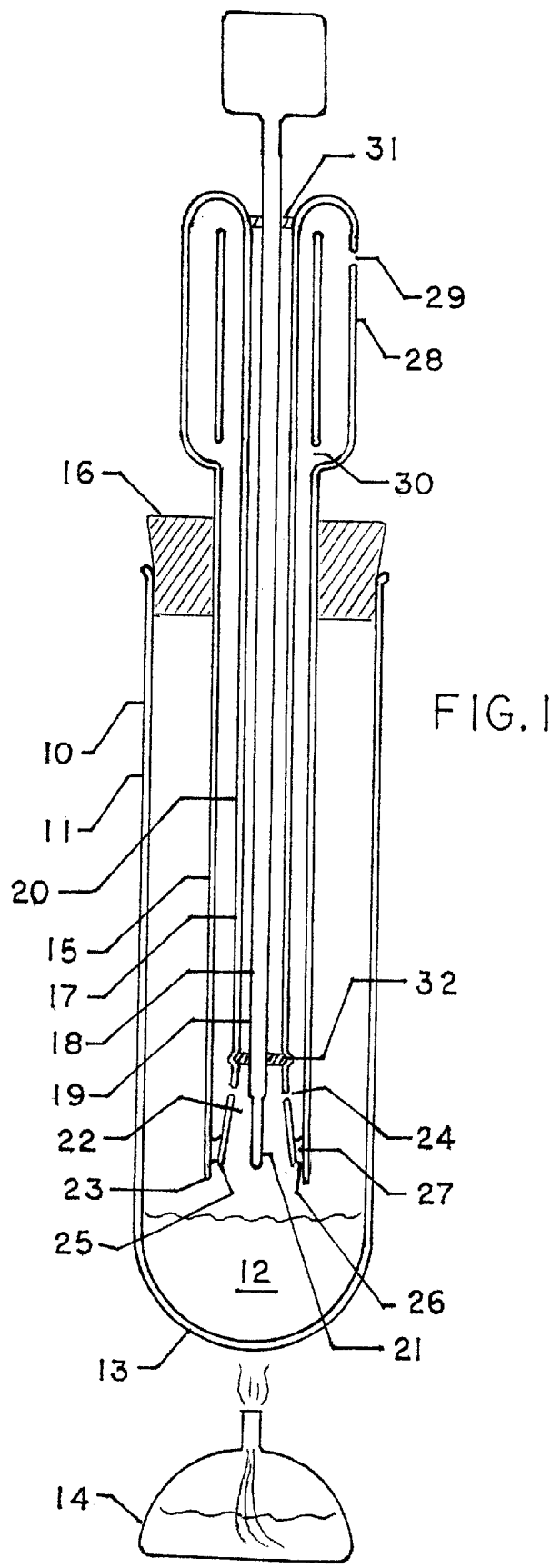
FIG. 1 shows a hypsometer which is one preferred embodiment of the invention.

FIG. 1 shows a side view of a hypsometer 10 which is a preferred embodiment of the present invention. The hypsometer 10 has a vessel 11 for containment of a working fluid 12 which in the embodiment shown in FIG. 1 happens to be water. The vessel 11 is elongated and held in a vertical position in normal operation. The working fluid 12 rests at the lower end 13, and is heated to boiling by some means of heating. In the embodiment shown in FIG. 1, the means of heating is an alcohol lamp 14.

Also shown in FIG. 1 is a vapor jacket 15. The space between the vessel 11 and the vapor jacket 15 is sealed off by a stopper 16 located near the top of the vessel 11. Therefore vapor from boiling working fluid 12 inside vessel 11 can escape to the atmosphere only through the inside of the vapor jacket 15.

A thermometer holder 17 is shown holding a thermometer 18. The stem 19 of the thermometer 18 is shown located inside the cylindrical portion 20 of the thermometer holder 17. The sensor tip 21 of the thermometer 18 is shown extending into a vapor chamber 22 which is actually an extension of the thermometer holder 17, and it is located near the lower end 23 of the vapor jacket 15. Near the top of the vapor chamber 22 are some holes 24. Near the bottom 25 of the vapor chamber 22 is at least one narrow opening 26. The details of the area around the sensor tip 21 of the thermometer 18 and the vapor chamber 22 are shown enlarged in FIG. 2. In the embodiment shown in FIGS. 1 and 2, the opening 26 is an annular gap that extended all around the circumference of the vapor chamber 22.

In operation, liquid collects at the opening 26 and is held there by surface tension to form a liquid seal 27, that allows liquid to pass through, but preventing passage of vapor, thereby assuring that the vapor from the vessel 11 passes through the vapor chamber 22 before escaping into the atmosphere. The liquid that collects at the seal 27 can be condensed vapor from higher up in the vapor jacket 15 or working fluid from an external source added to the vessel 11 for replenishment of the supply of working fluid 12 in the vessel 11.

FIG. 1 shows a condensation chamber 28 which is an extension of the vapor jacket 15 near its top end. Vapor of the working fluid condenses along the inner wall of the condensation chamber 28. A vent hole 29 allows vapor to escape into the atmosphere, thereby assuring equalization of pressure inside the hypsometer 10 and outside. Condensed working fluid returns to the vessel 11 through holes 30 at the bottom of the condensation chamber 28.

The thermometer 18 is held in place by two elastomeric seals 31 and 32, one near the top of the thermometer holder 17 and the other one near the bottom.

Figure 3:
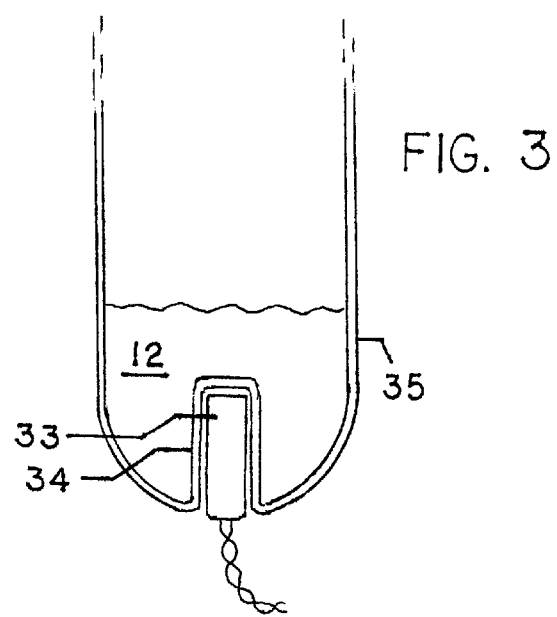
FIG. 3 shows the bottom part of a hypsometer which is another preferred embodiment of the invention.

Part of another embodiment of the invention is shown in FIG. 3. In the embodiment of FIG. 3, the means for heating the working fluid 12 is not an alcohol lamp as in FIG. 1, but it is an electric heating element 33 placed in a well 34 at the bottom of a vessel 35.

Figure 2:
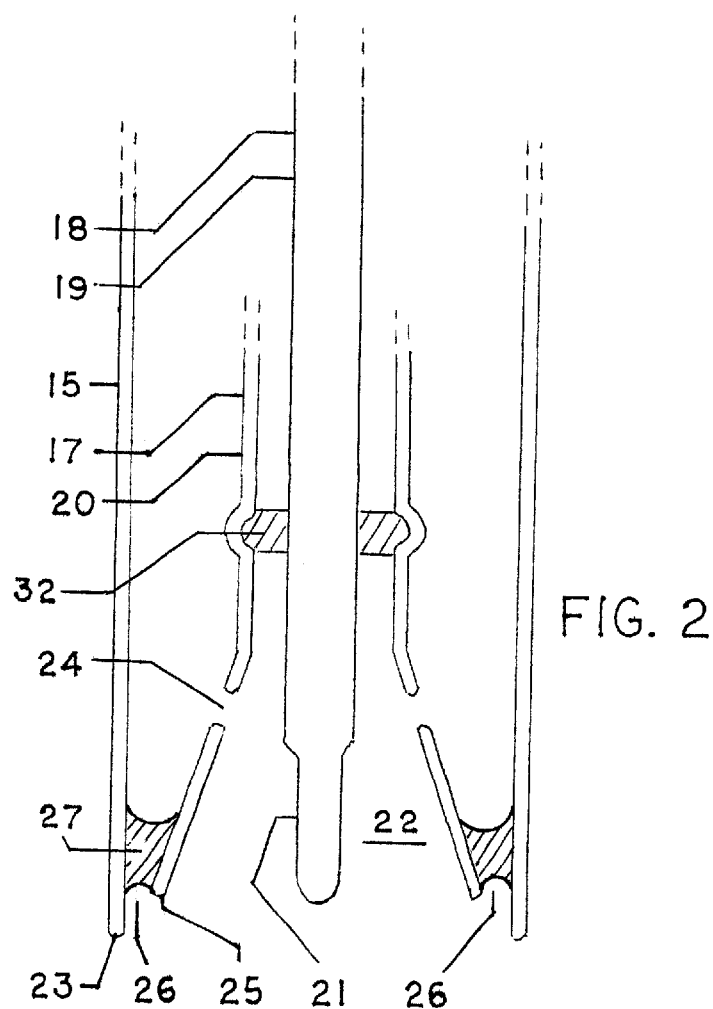
FIG. 2 shows an enlarged viewed of the area around the vapor chamber in the hypsometer of FIG. 1.

The embodiments of hypsometers shown in FIGS. 1–3 are intended for use with water as the working fluid. The boiling point of water at typical sea-level atmospheric pressure (760 mm of mercury) is about 100 degrees C. The vessel 11, vapor jacket 15, and thermometer holder 17 are all made of borosilicate glass (also known as Pyrex).

The thermometer 18 is typically a platinum resistance thermometer, which in most cases would already have been calibrated at the triple point of water. For such an application, the dimensions of the various parts are: the vessel 11 diameter 2 inches, 10 inches long; the vapor jacket 15 diameter 1 inch, 12 inches long; the thermometer holder 17 diameter 0.5 inch at its cylindrical section, the gap 26 is typically 0.039 inches (1 mm) wide. A good barometer is used to measure the atmospheric pressure to an accuracy of 0.25 mm Hg. Then a hypsometer according to the present invention can be expected to calibrate the thermometer to an accuracy of 0.01 degree C.

In operation the heating means (whether it is alcohol lamp 14 or electric heater 33) heats the working fluid 12 to boiling. Ideally the input power of the heater is adjusted to just a little more than enough to keep the working fluid 12 boiling (typically about 100 watts). Vapor (steam when water is the working fluid 12) rises and fills the vessel 11. Some of the vapor rises to the upper part 35 of the vessel 11 where it condenses and returns to the supply at the bottom. The vessel 11 is made sufficiently long (at least 150 mm, 6 inches) to provide ample area for condensation which helps prevent the pressure inside of vessel 11 from rising above atmospheric value.

Some of the vapor enters the vapor chamber 22 where it heats the sensor tip 21 of the thermometer 18 to boiling point. Most of the vapor that enters the vapor chamber 22 passes through the holes 24 and travels up the vapor jacket 15 (around the thermometer holder 17). This rising vapor heats the thermometer stem 19 to the boiling point thus assuring that the sensor tip 21 is not cooled by heat conduction up the stem 19. The elastomeric seals 31 and 32 prevent the vapor from reaching the thermometer stem 19, thus keeping the stem 19 dry, and preventing liquid (eg, condensed working fluid) from dripping down the stem 19 to the sensor tip 21.

Some of the rising vapor reaches the condensation chamber 28 where most of the vapor condenses and returns to the vessel 11. On its way down, the liquid working fluid passes by the opening 26 and is held there by surface tension (until a large enough volume of liquid collects, thus having enough weight to overcome the surface tension and drips down as droplets). Enough liquid remains at the opening 27 to keep the opening 26 sealed against rising vapor. Thus the rising vapor is forced to travel through the vapor chamber 22 to keep the sensor tip 21 at the proper temperature.

A small amount of vapor may escape through the vent hole 29. All the time, some of the vapor will condense on the outer surface of the thermometer holder 17 and the surfaces of the vapor jacket 15, the liquid thus formed will all drip back down to the supply at the bottom of vessel 11.

The hypsometer will reach thermal equilibrium after the heater has been turned on for about one hour. Equilibrium is indicated by the absence of abrupt temperature fluctuations. Until equilibrium is established, there will be some temperature fluctuations, so calibration should not be performed before equilibrium is reached.

Equilibrium can be maintained for as long as the supply of working fluid last (typically 2 hours), and the supply can be replenished by injecting working fluid through the vent hole 29. Equilibrium is disturbed while working fluid is being replenished, but it will reestablish itself within a short time (typically 5 minutes).

In the embodiment shown in FIG. 1, the vapor chamber 22 is conical in shape. The conical shape has been chosen for its ease of fabrication. The exact shape of the vapor chamber 22 is not critical, the hypsometer would have functioned if the vapor chamber 22 had been spherical, cylindrical, or any other reasonable shape.

The invention can be applied to hypsometers operating with working fluids other than water (for example, mercury, and organic fluids having a higher or lower boiling point). The physical dimensions and perhaps also materials of some parts of the apparatus may have to be changed to fuction properly at a different temperature: For example, the area provided for condensation would have to be increased (or decreased) when using working fluids having a lower (higher) boiling point. For use with certain working fluids (for example mercury) the hypsometer needs to be equipped with means (such as a cold trap) to prevent escape of working fluid into the atmosphere.

While specific embodiments of the invention has been described above to illustrate the principles of operation, the invention is not limited to the sizes and shapes of these preferred embodiments. Scope of the invention is determined by the following claims.

I claim:

1. A hypsometer comprising
   an elongated vessel for containment of a working fluid;
   means for heating said fluid to its boiling point;
   a vapor jacket to provide a path for the vapor to escape to the atmosphere, thus assuring equalization of pressure between the interior of the vessel and the outside atmosphere;
   a vapor chamber near the lower end of the vapor jacket;
   a thermometer holder to hold a thermometer at a position with its sensor tip inside the vapor chamber;
   said vapor jacket leading to a narrow opening near its lower end where working fluid, in liquid state, collects to form a liquid seal allowing liquid to pass through, but preventing passage of vapor, thereby assuring that the vapor from the vessel must pass through the vapor chamber before escaping into the atmosphere.

2. A hypsometer according to claim 1 wherein said working fluid is water.

3. A hypsometer according to claim 1 wherein said elongated vessel being at least 150 mm long.

4. A hypsometer according to claim 1 wherein said means for heating said working fluid is an alcohol lamp.

5. A hypsometer according to claim 1 wherein said means for heating said working fluid is an electric heating element.

6. A hypsometer according to claim 1 wherein said vapor chamber is conical in shape.

7. A hypsometer according to claim 1 wherein said thermometer holder is cylindrical in shape.

8. A hypsometer according to claim 7 further comprising elastomeric seals between said thermometer holder and said thermometer to prevent condensed liquid from dripping down the thermometer.

* * * * *